O. FRENCH.
VEHICLE SPRING.
APPLICATION FILED MAR. 2, 1916.
1,287,665.
Patented Dec. 17, 1918.
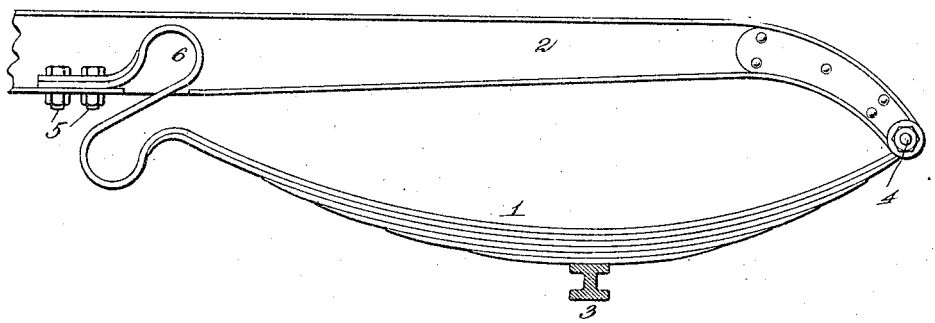
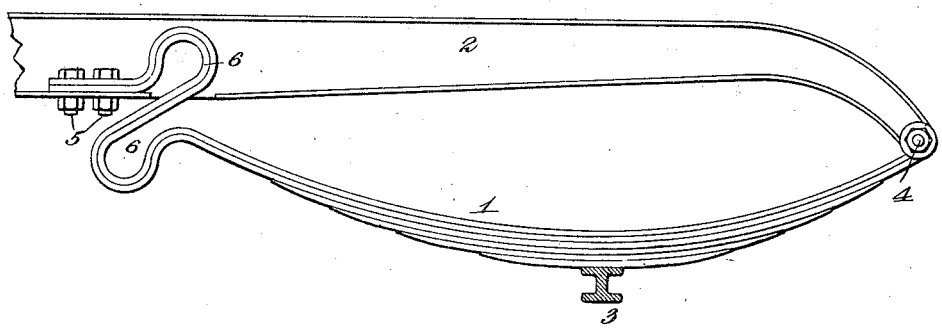
Witnesses:
Inventor
Oscar French
By Dyer Taylor
Attorneys

UNITED STATES PATENT OFFICE.

OSCAR FRENCH, OF ATHENS, PENNSYLVANIA.

VEHICLE-SPRING.

1,287,885.          Specification of Letters Patent.          Patented Dec. 17, 1918.

Application filed March 2, 1916. Serial No. 81,601.

*To all whom it may concern:*

Be it known that I, OSCAR FRENCH, a citizen of the United States, resident of Athens, county of Bradford, State of Pennsylvania, have invented a certain new and useful Vehicle-Spring, of which the following is a specification.

This invention relates to improvements in vehicle springs. The invention is particularly adapted to the springs of automobiles, although it is not limited to such use.

The objects of said invention are to prevent wear and consequent lost motion in the connection between the springs and the frame of a vehicle.

This and further objects will more fully appear in the following specification and accompanying drawings, considered together or separately.

In the drawings,

Figure 1 is a side view of a semi-elliptic spring embodying my invention; and

Fig. 2 is a similar view of a modification.

In all views like parts are designated by the same reference characters.

My improved spring 1 is connected to a support, such as a frame member 2 of a vehicle of any suitable shape. The spring is carried on an axle 3 in any suitable manner which forms no part of the present invention. One end of the spring is secured to a support, such as the frame member 2 by means of an immovable connection, for example by a bolt 4. The other end of the spring is secured to a support, as the frame member 2, also by an unyielding connection, for example by bolts 5, 5. At one end of the spring is a yielding portion 6 which is preferably made in S shape, as shown. It may be made of one spring leaf, as shown in Fig. 1, or a plurality of leaves as shown in Fig. 2. This yielding connection permits the movement of the spring and axle without the use of jointed or slipping connections between the spring and its support. For this reason there is nothing to wear and thereby produce loose joints. Therefore the use of shackles, heretofore considered necessary in connection with vehicle springs is avoided.

My structure provides a spring in which both ends are rigidly connected to the support. Therefore the spring cannot move endwise only as it does in the S portion.

Any suitable support for the spring may be used.

In the embodiment chosen for illustration the distance between the ends of the spring is invariable, irrespective of the compression of the spring.

While I have shown my invention as applied to a semi-elliptic spring, I desire to have it understood that the same may be used on various other types of springs, such as ¾ elliptic, side and ¼ scroll elliptic springs.

In accordance with the provisions of the patent statutes, I have described the principle of my invention together with the apparatus which I now consider to represent the best embodiment thereof, but I desire to have it understood that the apparatus shown is merely illustrative and that the invention may be carried out in other ways.

Having now described my invention, what I claim as new and desire to secure by Letters Patent, is:

A semi-elliptic spring for vehicles having an immovable connection with the support at one end, and an integral S shaped portion adjacent to the other end, the distance between the ends of the spring being invariable.

This specification signed and witnessed this 25th day of February, 1916.

OSCAR FRENCH.

Witnesses:
  THOS. B. LAWLER,
  GEO. SQUIRES.